US012723124B2

(12) United States Patent
Shi et al.

(10) Patent No.: US 12,723,124 B2
(45) Date of Patent: Sep. 1, 2026

(54) STORAGE-STABLE POLYISOCYANATE COMPOSITION AND PREPARATION METHOD THEREFOR

(71) Applicants: WANHUA CHEMICAL GROUP CO., LTD., Yantai (CN); WANHUA CHEMICAL (NINGBO) CO., LTD., Ningbo (CN)

(72) Inventors: Bin Shi, Yantai (CN); Yonghua Shang, Yantai (CN); Tao Yu, Yantai (CN); Xianfeng Zhang, Yantai (CN); Chengyue Yan, Yantai (CN); Zhicheng Zhu, Yantai (CN); Wei Liu, Yantai (CN); Fuyou Lu, Yantai (CN); Nuancheng Wang, Yantai (CN); Yuqi Wang, Yantai (CN); Yuan Li, Yantai (CN); Xiaopeng Zhang, Yantai (CN); Haijun Li, Yantai (CN)

(73) Assignees: WANHUA CHEMICAL GROUP CO., LTD., Yantai (CN); WANHUA CHEMICAL (NINGBO) CO., LTD., Ningbo (CN)

( * ) Notice: Subject to any disclaimer, the term of this patent is extended or adjusted under 35 U.S.C. 154(b) by 797 days.

(21) Appl. No.: 18/005,387

(22) PCT Filed: Sep. 25, 2020

(86) PCT No.: PCT/CN2020/117698

§ 371 (c)(1),
(2) Date: Jan. 13, 2023

(87) PCT Pub. No.: WO2022/061704

PCT Pub. Date: Mar. 31, 2022

(65) Prior Publication Data

US 2023/0272151 A1 Aug. 31, 2023

(51) Int. Cl.

*C08G 18/16* (2006.01)
*C08G 18/02* (2006.01)
*C08G 18/18* (2006.01)
*C08G 18/32* (2006.01)
*C08G 18/73* (2006.01)
*C08G 18/79* (2006.01)
*C08G 18/80* (2006.01)

(52) U.S. Cl.

CPC ........... *C08G 18/168* (2013.01); *C08G 18/02* (2013.01); *C08G 18/022* (2013.01); *C08G 18/1875* (2013.01); *C08G 18/3206* (2013.01); *C08G 18/73* (2013.01); *C08G 18/79* (2013.01); *C08G 18/8016* (2013.01)

(58) Field of Classification Search

CPC ...... C08G 18/168; C08G 18/02; C08G 18/73; C08G 18/79; C08G 18/022; C08G 18/3206; C08G 18/8016; C08G 18/1875

See application file for complete search history.

(56) References Cited

U.S. PATENT DOCUMENTS

| | | | |
|---|---|---|---|
| 11,359,045 | B2 | 6/2022 | Hahn et al. |
| 2020/0277430 | A1 | 9/2020 | Azuma et al. |

FOREIGN PATENT DOCUMENTS

| | | | | |
|---|---|---|---|---|
| CN | 103724234 A | | 4/2014 | |
| CN | 105601565 | | 5/2016 | |
| CN | 110305294 A | | 10/2019 | |
| CN | 111072917 | | 4/2020 | |
| CN | 111201257 | | 5/2020 | |
| CN | 111247185 | | 6/2020 | |
| CN | 111465632 | | 7/2020 | |
| CN | 111793182 | | 10/2020 | |
| DE | 102004060739 A1 | | 6/2006 | |
| EP | 4056619 | | 9/2022 | |
| JP | 08225511 A | | 9/1996 | |
| JP | H1036470 | | 2/1998 | |
| JP | 2002047333 A | | 2/2002 | |
| JP | 2016037539 A | | 3/2016 | |
| JP | 2016053127 A | | 4/2016 | |
| KR | 20170047877 | | 5/2017 | |
| WO | WO-2019078250 A1 | * | 4/2019 | ........... C09D 175/04 |
| WO | 2020078241 A1 | | 4/2020 | |
| WO | 2020078250 A1 | | 4/2020 | |

OTHER PUBLICATIONS

English language translation of CN 111201257 A. (Year: 2020).*
PCT Search Report and Written Opinion prepared for PCT Application No. PCT/CN2020/117698, completed Jun. 8, 2021.
European Search Report issued for Application No. 20954556.5, mailed Dec. 13, 2023.

* cited by examiner

*Primary Examiner* — Rabon A Sergent
(74) *Attorney, Agent, or Firm* — Barnes & Thornburg LLP

(57) ABSTRACT

The present invention belongs to the technical field of preparing isocyanate derivatives, and particularly relates to a storage-stable polyisocyanate composition and a preparation method therefor. The method comprises: in the presence of a catalyst system, subjecting an isocyanate monomer to a polymerization reaction; terminating the reaction after a suitable conversion rate is reached, so as to obtain a polyisocyanate reaction solution; and then performing heat treatment on the obtained polyisocyanate reaction solution to obtain a heat-treated polyisocyanate mixture, wherein the heat treatment temperature is 10-30° C. higher than the heat-sensitive temperature of the obtained polyisocyanate product, and the heat treatment time is 5-30 min; and then performing separation treatment on the heat-treated polyisocyanate mixture. When the polyisocyanate composition of the present invention is stored at 50° C. for 30 days, the viscosity increase is small, thus the stability of the viscosity is ensured, and at the same time, the stability of the free monomer content and the color stability are also significantly improved.

8 Claims, No Drawings

STORAGE-STABLE POLYISOCYANATE COMPOSITION AND PREPARATION METHOD THEREFOR

CROSS-REFERENCE TO RELATED APPLICATIONS

This application is a national stage entry under 35 U.S.C. § 371 (b) of PCT International Application No. PCT/CN2020/117698, filed Sep. 25, 2020, the entire disclosure of which is incorporated herein by reference.

TECHNICAL FIELD

The present disclosure belongs to the field of the preparation of isocyanate derivatives, and in particular, relates to a storage-stable polyisocyanate composition and a preparation method therefor.

BACKGROUND

It is well known that polyurethane resin coatings have excellent wear resistance, chemical resistance and contamination resistance, and in particular, the polyurethane resin coatings prepared with polyisocyanates derived from aliphatic (alicyclic) isocyanates such as hexamethylene diisocyanate, isophorone diisocyanate and dicyclohexylmethane diisocyanate even have excellent weather resistance. Therefore, these polyisocyanates are often used in polyurethane coatings which can be cured at normal temperature or by heating for painting and repairing buildings, automobiles, airplanes, ships and cross-sea bridges.

At present, methods for preparing polyisocyanates through the polymerization reaction of aromatic, aliphatic or alicyclic diisocyanate monomers in the presence of a catalyst are known, and the advantages and disadvantages of various catalyst systems have been discussed in detail in the existing documents, for example, *J. Prakt. Chem.* 336 (1994) 185-200, CN201410002995.5, CN95113103.6, CN200310120368.3, CN200310120121.1, CN200910128728.1, and CN201280059016.9.

However, the main disadvantage of polyisocyanate products prepared by the existing processes is that the viscosity of the polyisocyanate products increases rapidly in the storage process, which seriously affects long-distance transportation and downstream use. In view of the preceding problems, it is particularly important to explore how to improve the stability (especially the viscosity stability) of polyisocyanates in the storage process.

SUMMARY

An object of the present disclosure is to provide a storage-stable polyisocyanate composition and a preparation method therefor in view of the problems existing in the storage stability of existing polyisocyanates. When the polyisocyanate composition is stored at 50° C. for 30 days, the increase of the viscosity is very small, thereby ensuring the viscosity stability of the product, and facilitating the long-distance transportation and the downstream use, and the stability of the free monomer content in the product and the chromaticity stability are also significantly improved.

To achieve the preceding object, the technical solutions of the present disclosure are described below.

In an aspect, a storage-stable polyisocyanate composition is provided. The storage-stable polyisocyanate composition satisfies the following conditions ① and ② in a case of storage at 50° C. for 30 days:

① in the stored polyisocyanate composition, the increase of a content of an isocyanate monomer is less than or equal to 0.1 wt %, and for example, the increase of the content of the isocyanate monomer is 0.02 wt %, 0.04 wt %, 0.06 wt % or 0.08 wt %; and ② in the stored polyisocyanate composition, the increase of a viscosity of the polyisocyanate composition is less than or equal to 15% (for example, 14%, 12%, 8%, 6%, 4%, 2%, 1%, 0.5% or 0.1%) of a initial viscosity of the polyisocyanate composition.

According to the polyisocyanate composition provided by the present disclosure, in some examples, the polyisocyanate composition includes one or more of an isocyanurate structure, a carbamate structure, an allophanate structure, a biuret structure, an iminooxadiazine dione structure, a uretdione structure, a carbodiimide structure, and a uretonimine structure.

In some examples, the polyisocyanate composition is trimer polyisocyanate, biuret polyisocyanate or uretdione polyisocyanate.

For example, the trimer polyisocyanate includes one or more of an isocyanurate structure, a carbamate structure, an allophanate structure, an iminooxadiazine dione structure, a uretdione structure, a carbodiimide structure, and a uretonimine structure.

For example, the biuret polyisocyanate includes one or more of a biuret structure, a carbodiimide structure, a uretdione structure, and a uretonimine structure.

For example, the uretdione polyisocyanate includes one or more of a uretdione structure, an isocyanurate structure, a carbamate structure, an allophanate structure, an iminooxadiazine dione structure, a carbodiimide structure, and a uretonimine structure.

According to the polyisocyanate composition provided by the present disclosure, in some examples, the isocyanate monomer is selected from one or more of aromatic organic isocyanate, aliphatic organic isocyanate, and alicyclic organic isocyanate and is preferably selected from one or more of hexamethylene diisocyanate (HDI), isophorone diisocyanate (IPDI), cyclohexyl dimethylene diisocyanate (HMDI), xylylene diisocyanate (XDI), dicyclohexylmethane diisocyanate (HXDI), norbornane dimethylene diisocyanate (NBDI), cyclohexyl diisocyanate (CHDI), lysine diisocyanate (LDI), tetramethylxylylene diisocyanate (TMXDI), 2,4,4-trimethylhexamethylene diisocyanate (TMHDI), toluene diisocyanate (TDI), methylcyclohexyl diisocyanate (HTDI), naphthalene diisocyanate (NDI), p-phenylene diisocyanate (PPDI), methylene diphenyl diisocyanate (MDI), and polymethylene polyphenyl polyisocyanate (PM).

In another aspect, a method for preparing the storage-stable polyisocyanate composition is provided. The preparation method includes the following steps: carrying out a polymerization reaction on the isocyanate monomer in the presence of a catalyst system; after an appropriate conversion rate is reached, terminating the reaction to obtain a polyisocyanate reaction solution; carrying out heat treatment on the obtained polyisocyanate reaction solution to obtain a heat-treated polyisocyanate mixture, wherein a temperature of the heat treatment is 10-30° C. higher than a heat-sensitive temperature of the obtained polyisocyanate product, and a time of the heat treatment is 5-30 min; and then carrying out separation treatment on the heat-treated polyisocyanate mixture to remove unreacted isocyanate monomers in the system to prepare the polyisocyanate composition.

The term "appropriate conversion rate" herein may be understood as a preset conversion rate for the product to be prepared as desired. Conversion rates that different types of polyisocyanate products need to reach are different, and these conversion rates may be calculated and reflected by controlling the NCO % value of the reaction system; the above is well known to those skilled in the art, and details will not be repeated herein.

According to the preparation method provided by the present disclosure, in some examples, the polyisocyanate composition includes one or more of trimer polyisocyanate, biuret polyisocyanate, and uretdione polyisocyanate.

The heat-sensitive temperature of the polyisocyanate product herein may be understood as follows: the polyisocyanate product is heated at 100-200° C., such a heating temperature range is evenly divided into multiple temperature intervals, and the viscosity of the heated product is measured at these temperature intervals; that is, one temperature point may be selected at every 5° C., the product is heated for 2 h at such a temperature point, the viscosity of the product corresponding to the temperature point is measured, and the measured viscosity points and the corresponding temperature points are drawn as a viscosity-temperature curve. In the drawn curve, the temperature at which the viscosity of the product doubles is defined as the heat-sensitive temperature.

The heat-sensitive temperatures corresponding to different types of polyisocyanate products may be different.

In some examples, the heat-sensitive temperature of the trimer polyisocyanate is 160-165° C. (for example, 162° C., 163° C. or 164° C.).

In some examples, the heat-sensitive temperature of the biuret polyisocyanate is 140-145° C. (for example, 141° C., 142° C., 143° C. or 144° C.).

In some examples, the heat-sensitive temperature of the uretdione polyisocyanate is 130-135° C. (for example, 131° C., 132° C., 133° C. or 134° C.).

According to the preparation method provided by the present disclosure, in some embodiments, the increase of the viscosity of the polyisocyanate composition stored at 50° C. for 30 days is less than or equal to 15% of the initial viscosity of the polyisocyanate composition (for example, the increase of the viscosity is 14%, 10%, 8%, 6%, 4%, 2%, 1% or 0.5% of the initial viscosity).

The increase of the viscosity herein may refer to the percentage of the absolute difference between the measured viscosity of the polyisocyanate product stored at 50° C. for 30 days and the initial viscosity of the polyisocyanate product to the initial viscosity of the polyisocyanate product. The initial viscosity herein may refer to the viscosity of the polyisocyanate product before the storage.

In some embodiments, the increase of the content of unreacted monomers included in the polyisocyanate composition stored at 50° C. for 30 days is less than or equal to 0.1 wt %. The "increase of the content of unreacted monomers" or "increase of the content of an isocyanate monomer" herein refers to the absolute difference between the content of isocyanate monomers in the polyisocyanate composition stored in the preceding storage conditions and the content of isocyanate monomers in the polyisocyanate composition before the storage.

The polyisocyanate reaction solution includes polyisocyanate having one or more of an isocyanurate structure, a carbamate structure, an allophanate structure, a biuret structure, an iminooxadiazine dione structure, a uretdione structure, a carbodiimide structure, and a uretonimine structure. In some examples, the polyisocyanate reaction solution includes polyisocyanate having an isocyanurate structure, a carbamate structure, an allophanate structure, a biuret structure, an iminooxadiazine dione structure, a uretdione structure, a carbodiimide structure, and a uretonimine structure. For example, the reaction solution includes polyisocyanate having an isocyanurate structure, polyisocyanate having a carbamate structure, polyisocyanate having a biuret structure, polyisocyanate having a uretdione structure, and a combination thereof.

The applicant surprisingly finds that the storage stability (especially the viscosity stability and the stability of the content of unreacted monomers) of the final product is greatly improved by subjecting the reaction solution obtained from the polymerization reaction to heat treatment before the reaction solution enters the separation device for separation treatment and then separating the unreacted isocyanate monomers from the system. For example, for the polyisocyanate composition prepared using the preceding preparation method, the increase of the viscosity of the polyisocyanate composition stored at 50° C. for 30 days is less than or equal to 15% of the initial viscosity of the polyisocyanate composition, and the stability of the content of unreacted monomers and the color stability are also improved.

It is found through study that if the reaction solution is subjected to separation treatment first after the polymerization reaction, the obtained intermediate product with part of unreacted monomers removed or the obtained final product will be partially decomposed or polymerized when subjected to heat treatment at a high temperature higher than the heat-sensitive temperature of the product, due to the small content of unreacted monomers in the product, leading to great changes in the molecular mass distribution of the product and affecting the downstream application. If high-temperature heat treatment is carried out on the reaction solution before the separation treatment, since a certain number of unreacted monomers exist in the reaction solution, the molecular mass distribution of the reaction solution will not change greatly due to thermal equilibrium so that the change in the molecular mass distribution of the final product is small and thus the viscosity change of the product is small, thereby protecting the downstream application from adverse impact.

It is critical to control the process conditions of the heat treatment. If the temperature of the heat treatment is too high, the color and viscosity of the product will vary greatly, and if the temperature of the heat treatment is too low, the stability of the product cannot be improved. Therefore, an appropriate heat treatment temperature should be selected based on the heat-sensitive temperature of the polyisocyanate product, thereby achieving the ideal effect. If the time of the heat treatment is too long, the color and viscosity of the product will vary greatly, and if the time of the heat treatment is too short, the stability of the product cannot be improved.

In the present disclosure, the preparation method for the isocyanate monomer serving as the raw material is not important for the implementation of the preparation method of the present disclosure, and the isocyanate monomer used herein includes those prepared with or without phosgene or prepared using any other method, for example, aromatic, aliphatic and/or alicyclic organic isocyanate, which includes organic diisocyanate or polyisocyanate containing 4 to 20 carbon atoms in the carbon skeleton in addition to the NCO group.

In some examples, the separation treatment is carried out in the conventional manner in the art to remove the unreacted isocyanate monomers, which is not particularly limited thereto; the separation device used herein may be, for example, an extraction device, a rotary evaporator, a short-path evaporator, a film evaporator, and a combination thereof; the residual unreacted isocyanate monomers are removed from the resulting reaction solution until the content of isocyanate monomers in the product becomes low, for example, less than or equal to 0.5 wt % based on the mass of the composition.

In the present disclosure, the preparation methods of different polyisocyanate products may be different.

For example, the polyisocyanate composition may be trimer polyisocyanate.

In a first embodiment, the method for preparing the storage-stable polyisocyanate includes the following steps:

(11) under an inert atmosphere, adding the isocyanate monomer to a reaction vessel, heating the isocyanate monomer, adding (for example, adding dropwise) a catalyst I after the system is heated to a reaction temperature, carrying out a polymerization reaction, and monitoring NCO % of the reaction solution; and when the NCO % drops to an appropriate value (for example, 35-45%), adding a terminating agent I to terminate the reaction to obtain a trimer polyisocyanate reaction solution;

(12) carrying out heat treatment on the obtained trimer polyisocyanate reaction solution to obtain a heat-treated trimer polyisocyanate mixture, where a temperature of the heat treatment is 10-30° C. higher than a heat-sensitive temperature of the obtained polyisocyanate product, and a time of the heat treatment is 5-30 min; and

(13) then carrying out separation treatment on the heat-treated trimer polyisocyanate mixture through a separation device (for example, a two-stage film evaporator) to remove unreacted isocyanate monomers to prepare trimer polyisocyanate;

where the heat-sensitive temperature of the trimer polyisocyanate is 160-165° C.

For example, the trimer polyisocyanate reaction solution includes polyisocyanate having one or more of an isocyanurate structure, a carbamate structure, an allophanate structure, an iminooxadiazine dione structure, a uretdione structure, a carbodiimide structure, and a uretonimine structure, and preferably includes polyisocyanate having an isocyanurate structure, a carbamate structure, an allophanate structure, an iminooxadiazine dione structure, a uretdione structure, a carbodiimide structure, and a uretonimine structure.

In some examples, the catalyst I in step (11) is a quaternary ammonium base and/or a quaternary ammonium salt catalyst and is preferably selected from choline hydroxide, hydroxyethyltrimethylammonium hydroxide, tetramethylammonium hydroxide, tetraethylammonium hydroxide, tetrapropylammonium hydroxide, tetrabutylammonium hydroxide, benzyltrimethylammonium hydroxide, 1-adamantanaminium hydroxide, hexamethonium hydroxide, a tetraalkylammonium (for example, tetramethylammonium, tetraethylammonium, and the like) salt of organic weak acid (for example, formic acid, acetic acid, decanoic acid, and the like), tetramethylammonium caprylate, a hydroxypropyltrimethylammonium salt of organic weak acid (for example, formic acid, acetic acid, decanoic acid, and the like), and a hydroxyethyltrimethylammonium salt of organic weak acid (for example, formic acid, acetic acid, decanoic acid, and the like).

The tetraalkylammonium salt of organic weak acid may be tetramethylammonium formate, tetramethylammonium acetate, tetramethylammonium decanoate, tetraethylammonium formate, tetraethylammonium acetate or tetraethylammonium decanoate. The hydroxypropyltrimethylammonium salt of organic weak acid may be hydroxypropyltrimethylammonium formate, hydroxypropyltrimethylammonium acetate or hydroxypropyltrimethylammonium decanoate. The hydroxyethyltrimethylammonium salt of organic weak acid may be hydroxyethyltrimethylammonium formate, hydroxyethyltrimethylammonium acetate or hydroxyethyltrimethylammonium decanoate.

In some examples, an addition amount of the catalyst I is 0.001-0.1 wt % (for example, 0.0025 wt %, 0.005 wt %, 0.01 wt %, 0.04 wt %, 0.06 wt % or 0.08 wt %) of a weight of the isocyanate monomer.

The catalyst I may be used as a pure substance or may be optionally dissolved in an alcohol at any concentration. As a diluent of the catalyst, the alcohol may be, but is not limited to, a monohydric alcohol and/or a dihydric alcohol. The monohydric alcohol is preferably selected from one or more of aliphatic alcohol of C1-C10, arylaliphatic alcohol, aromatic alcohol, aliphatic phenol, arylaliphatic phenol, and aromatic phenol and is more preferably a linear, branched or cyclic alcohol or a linear, branched or cyclic phenol. The dihydric alcohol may be, but is not limited to, for example, ethylene glycol, 1,3-propanediol, 1,2-propanediol, 1,3-butanediol, 1,4-butanediol, 2,3-butanediol, 1,5-pentanediol, 1,2-pentanediol, 1,3-pentanediol, 1,4-pentanediol, neopentyl glycol, 1,6-hexanediol, 1,7-heptanediol, 1,8-octanediol, 1,9-nonanediol, 1,10-decanediol, diethylene glycol, polyethylene glycol, polypropylene glycol, polytetramethylene glycol, 2-methyl-1,3-propanediol, 3-methyl-1,5-pentanediol, 2-ethyl-1,3-hexanediol, 2-methyl-1,8-octanediol, and 2,2-diethyl-1,3-propanediol.

In some examples, the terminating agent I in step (11) is selected from an organic acid and/or an acylating agent and is preferably selected from one or more of formic acid, benzoic acid, benzoyl chloride, dibutyl phosphate, and bis(2-ethylhexyl)phosphate.

It is to be understood by those skilled in the art that different amounts of the terminating agent are required when different polymerization catalysts are used in the reaction system. In the reaction system of the present disclosure, the amounts of the terminating agent I are those that needed to inactivate the polymerization catalyst I in the system.

In some examples, a reaction temperature of step (11) is 30-100° C. (for example, 35° C., 50° C., 60° C., 70° C. or 90° C.), preferably 40-80° C.

In some examples, before the polyisocyanate reaction solution obtained after the reaction is terminated enters the separation device, the polyisocyanate reaction solution is subjected to heat treatment in step (12) by being heated to 10-30° C. higher than the heat-sensitive temperature of the product with a retention time of 5-30 min. A heat-sensitive temperature of the trimer polyisocyanate is 160-165° C., which means that the temperature of the heat treatment is 170-195° C. (for example, 175° C., 180° C. or 190° C.).

In some examples, the separation treatment in step (13) has the process conditions that a separation temperature is 90-180° C. (for example, 100° C., 135° C., 140° C., 150° C. or 175° C.), preferably 130-180° C., and a separation absolute pressure is 5-200 Pa (for example, 150 Pa, 100 Pa, 50 Pa, 20 Pa or 10 Pa).

For example, the content of residual monomers in the trimer polyisocyanate composition obtained after the separation treatment is less than or equal to 0.2 wt % based on the mass of the composition.

In some specific embodiments, the method for preparing HDI trimer polyisocyanate includes the following steps:

(11) under an inert atmosphere, hexamethylene diisocyanate (HDI) is added to a reaction vessel, a catalyst I is added dropwise after the system is heated to 60-80° C., a polymerization reaction is carried out, and NCO % of the reaction solution is monitored; and when the NCO % drops to an appropriate value (for example, 35-45%), a terminating agent I is added to terminate the reaction to obtain an HDI trimer polyisocyanate reaction solution;

(12) heat treatment is carried out on the obtained HDI trimer polyisocyanate reaction solution to obtain a heat-treated HDI trimer polyisocyanate mixture, where a temperature of the heat treatment is 10-30° C. higher than a heat-sensitive temperature of the obtained polyisocyanate product, and a time of the heat treatment is 5-30 min; and

(13) separation treatment is carried out on the heat-treated HDI trimer polyisocyanate mixture through a separation device (for example, a two-stage film evaporator) to remove unreacted isocyanate monomers to prepare the HDI trimer polyisocyanate;

where the heat-sensitive temperature of the HDI trimer polyisocyanate is 160-165° C.

It is found that the catalyst I and the terminating agent I in the system can generate a salt compound when the reaction is terminated, and such a salt compound still has weak catalytic activity so that the stability of the product in certain storage conditions is poor. It is speculated that when high-temperature heat treatment is carried out on the reaction solution, the salt compound generated by the catalyst and the terminating agent can react with isocyanate groups in the reaction solution at a high temperature to generate more stable substances and thus loses catalytic activity, thereby significantly improving the storage stability of the product.

For example, the polyisocyanate composition may be biuret polyisocyanate.

In a second embodiment, the method for preparing the storage-stable polyisocyanate includes the following steps:

(21) adding the isocyanate monomer and an acid catalyst to a reaction vessel, introducing water vapor as a biuret reagent after the system is heated to a reaction temperature, carrying out a polymerization reaction, and monitoring NCO % of the reaction solution; and when the NCO % drops to an appropriate value (for example, 33-37%), stopping introducing the water vapor to terminate the reaction to obtain a biuret polyisocyanate reaction solution;

(22) carrying out heat treatment on the obtained biuret polyisocyanate reaction solution to obtain a heat-treated biuret polyisocyanate mixture, wherein a temperature of the heat treatment is 10-30° C. higher than a heat-sensitive temperature of the obtained polyisocyanate product, and a time of the heat treatment is 5-30 min; and

(23) then carrying out separation treatment on the biuret polyisocyanate mixture through a separation device (for example, a two-stage wiped-film evaporator) to remove unreacted monomers to prepare biuret polyisocyanate;

where the heat-sensitive temperature of the biuret polyisocyanate is 140-145° C.

For example, the biuret polyisocyanate reaction solution includes polyisocyanate having one or more of a biuret structure, a uretdione structure, a carbodiimide structure, and a uretonimine structure and preferably includes polyisocyanate having a biuret structure, a uretdione structure, a carbodiimide structure, and a uretonimine structure.

In some examples, a mass ratio of the isocyanate monomer to the water vapor in step (21) is 40-60:1 (for example, 45:1, 50:1, 55:1 or 58:1).

In some examples, the acid catalyst in step (21) is selected from one or more of monoalkyl phosphate, dialkyl phosphate, monoaryl phosphate, diaryl phosphate, propionic acid, and pivalic acid. Preferably, the monoalkyl phosphate, dialkyl phosphate, monoaryl phosphate or diaryl phosphate is an aliphatic, branched aliphatic or arylaliphatic group thereof having 1 to 30 carbon atoms, more preferably 4 to 20 carbon atoms, and for example, may be methyl phosphate, ethyl phosphate, dibutyl phosphate, dihexyl phosphate, bis(2-ethylhexyl)phosphate, isooctyl phosphate, n-dodecyl phosphate, diethyl phosphate, di-n-propyl phosphate, di-n-butyl phosphate, diisoamyl phosphate, di-n-decyl phosphate, diphenyl phosphate, and a mixture thereof.

In some examples, an amount of the acid catalyst is 0.1-3.0 wt % (for example, 0.2 wt %, 0.5 wt %, 1.0 wt %, 1.5 wt %, 2.0 wt % or 2.5 wt %) of a weight of the isocyanate monomer.

The acid catalyst may be prepared into a solution or a dispersion with a suitable solvent to be added, and preferably, the acid catalyst is directly added to the system. In order to better inhibit the formation of insoluble polyurea in the reaction solution, if appropriate, a solvent may be additionally added to the isocyanate solution. For example, the suitable solvent may be, but is not limited to, one or more of butyl acetate, ethyl acetate, tetrahydrofuran, propylene glycol methyl ether acetate, xylene, propyleneglycol diacetate, butanone, methyl isoamyl ketone, cyclohexanone, hexane, toluene, xylene, benzene, chlorobenzene, orthodichlorobenzene, hydrocarbon mixtures, dichloromethane, and trialkyl phosphate. The acid catalyst may also be one or more of propylene glycol methyl ether acetate, triethyl phosphate, tri-n-butyl phosphate, and trimethyl phosphate. However, the reaction of the present disclosure is preferably carried out without the addition of the solvent.

In some examples, a reaction temperature of step (21) is 80-280° C. (for example, 110° C., 150° C., 200° C. or 260° C.), preferably 100-250° C., and a reaction time of step (21) is 50-400 min (for example, 100 min, 150 min, 200 min or 300 min), preferably 60-350 min.

For the reaction system herein, in the development phase, the conversion rate of the reaction may be determined based on the NCO % value, and after the conversion rate reaches the set requirements, the introduction of water vapor is stopped to terminate the reaction. In the industrialization phase, the reaction may be completed generally by controlling the amount of added water after the reaction has stabilized. No terminating agent needs to be added to terminate the reaction.

In some examples, before the polyisocyanate reaction solution obtained after the reaction is terminated enters the separation device, the polyisocyanate reaction solution is subjected to heat treatment in step (22) by being heated to 10-30° C. higher than the heat-sensitive temperature of the product with a retention time of 5-30 min. A heat-sensitive temperature of the biuret polyisocyanate is 140-145° C., which means that the temperature of the heat treatment is 150-175° C. (for example, 155° C., 160° C. or 170° C.).

In some examples, the separation device in step (23) is a two-stage wiped-film evaporator, the wiped-film system of the wiped-film evaporator may be of a roller type or a blade type, and the evaporator may be a film evaporator or a short-path evaporator. The separation treatment has the process conditions that a separation temperature of the first-stage wiped-film evaporator is 110-180° C. (for example, 120° C., 140° C. or 160° C.), and a separation absolute pressure of the first-stage wiped-film evaporator is 5-500 Pa (for example, 5 Pa, 10 Pa, 50 Pa, 100 Pa, 200 Pa or 400 Pa); and a separation temperature of the second-stage wiped-film evaporator is 120-180° C. (for example, 130° C., 140° C. or 160° C.), and a separation absolute pressure of the second-stage wiped-film evaporator is 5-200 Pa (for example, 5 Pa, 10 Pa, 50 Pa, 100 Pa or 150 Pa).

In some specific embodiments, the method for preparing biuret polyisocyanate includes the following steps:

(21) hexamethylene diisocyanate (HDI) and an acid catalyst are added to a reaction vessel, water vapor is introduced as a biuret reagent after the system is heated to a reaction temperature, a polymerization reaction is carried out, and NCO % of the reaction solution is monitored; and when the NCO % drops to an appropriate value (for example, 33-37%), the introduction of the water vapor is stopped to terminate the reaction to obtain a biuret polyisocyanate reaction solution;

(22) heat treatment is carried out on the obtained biuret polyisocyanate reaction solution to obtain a heat-treated biuret polyisocyanate mixture, where a temperature of the heat treatment is 10-30° C. higher than a heat-sensitive temperature of the obtained polyisocyanate product, and a time of the heat treatment is 5-30 min; and

(23) then separation treatment is carried out on the heat-treated biuret polyisocyanate mixture through a separation device (for example, a two-stage wiped-film evaporator) to remove unreacted HDI monomers to prepare 100% solid biuret polyisocyanate;

where the heat-sensitive temperature of the biuret polyisocyanate is 140-145° C.

It is found that if the unreacted isocyanate monomers are directly separated and removed from the reaction solution after the reaction is completed, a part of the catalyst in the system (generally, the residual amount is 100-300 ppm, and such a residual amount may induce the slow decomposition of polyisocyanate having a biuret structure) will remain in the polyisocyanate product, and the residual catalyst still has catalytic activity and further catalyzes the slow decomposition of polyisocyanate, thereby reducing the stability of the product in certain storage conditions; meanwhile, when the polyisocyanate product is diluted with a solvent that contains trace amounts of water (the water content of the industrial solvent is about less than 300 ppm), the residual catalyst that still has catalytic activity will further catalyze the reaction between residual trace amounts of water and polyisocyanate, thereby causing poor storage stability of the product. However, if the heat treatment is carried out on the reaction solution before the unreacted monomers are removed, it is speculated that because the residual catalyst in the resulting reaction solution includes active hydrogen which can react with the NCO groups of isocyanate, and the reaction between active hydrogen and the NCO groups is promoted at a high temperature to produce more stable substances although the reaction is extremely slow at a low temperature, the residual catalyst loses catalytic activity, thereby significantly improving the storage stability of the product.

For example, the polyisocyanate composition may be uretdione polyisocyanate.

In a third embodiment, the method for preparing the storage-stable polyisocyanate includes the following steps:

(31) adding the isocyanate monomer to a reaction vessel, heating the isocyanate monomer, adding a catalyst II and a cocatalyst sequentially with stirring after the system is heated to a reaction temperature, carrying out a polymerization reaction, and monitoring NCO % of the reaction solution; and when the NCO % drops to an appropriate value (for example, 38-42%), adding a terminating agent II to terminate the reaction to obtain a uretdione polyisocyanate reaction solution;

(32) carrying out heat treatment on the obtained uretdione polyisocyanate reaction solution to obtain a heat-treated uretdione polyisocyanate mixture, where a temperature of the heat treatment is 10-30° C. higher than a heat-sensitive temperature of the obtained polyisocyanate product, and a time of the heat treatment is 5-30 min; and

(33) then carrying out separation treatment on the uretdione polyisocyanate mixture through a separation device (for example, a two-stage short-path evaporator) to remove unreacted monomers in the reaction system to prepare uretdione polyisocyanate;

where the heat-sensitive temperature of the uretdione polyisocyanate is 130-135° C.

For example, the uretdione polyisocyanate reaction solution includes polyisocyanate having one or more of an isocyanurate structure, a carbamate structure, an allophanate structure, an iminooxadiazine dione structure, a uretdione structure, a carbodiimide structure, and a uretonimine structure and preferably includes polyisocyanate having an isocyanurate structure, a carbamate structure, an allophanate structure, an iminooxadiazine dione structure, a uretdione structure, a carbodiimide structure, and a uretonimine structure.

In some examples, the catalyst II in step (31) is a tertiary phosphine catalyst and has a structure represented by Formula i:

Formula i

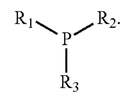

In the formula, $R_1$, $R_2$, and $R_3$ are independently selected from an aliphatic substituent or an aromatic substituent.

In some examples, the aliphatic substituent is selected from linear alkyl, branched alkyl or cycloalkyl, preferably linear alkyl of C1 to C10, branched alkyl of C3 to C10 or cycloalkyl of C3 to C10; the aromatic substituent is an aromatic substituent of C7 to C10, preferably benzyl.

In some embodiments, the catalyst II is selected from one or more of trimethylphosphine, triethylphosphine, tripropylphosphine, triisopropylphosphine, tri-n-butylphosphine, tri-tert-butylphosphine, dicyclopentylbutylphosphine, tripentylphosphine, tricyclopentylphosphine, trihexylphosphine, triphenylphosphine, tribenzylphosphine, benzyldimethylphosphine, tricyclohexylphosphine, and tri-n-octylphosphine, preferably one or more of tri-tert-butylphosphine, tri-n-butylphosphine, and tri-n-octylphosphine.

In some examples, an amount of the catalyst II is 0.01-1 wt % (for example, 0.02 wt %, 0.04 wt %, 0.08 wt %, 0.1 wt %, 0.2 wt %, 0.4 wt %, 0.6 wt % or 0.8 wt %) of a weight of the isocyanate monomer, preferably 0.05-0.5 wt %.

In the present disclosure, the tertiary phosphine catalyst is a nucleophilic reagent and can be easily oxidized by oxygen in the air, and when the tertiary phosphine catalyst is used, the reaction system must be strictly deoxygenated and protected by inert gas additionally. For example, tri-n-octylphosphine, when exposed to the air, can undergo a violent oxidation reaction and then generates trioctylphosphine oxide.

In the reaction system herein, a suitable alcohol may optionally be selected as a cocatalyst and used with the tertiary phosphine catalyst.

In some examples, the cocatalyst in step (31) is selected from a low molecular mass monovalent fatty alcohol or a low molecular mass polyvalent fatty alcohol and is preferably selected from a monovalent fatty alcohol in a low molecular mass of 32-250 or a polyvalent fatty alcohol in a low molecular mass of 32-250. These monovalent or polyvalent fatty alcohols, for example, may be selected from one or more of methanol, ethanol, n-propanol, isopropanol, n-butanol, n-hexanol, octanol, 2-ethyl-1-hexanol, ethylene glycol, propylene glycol, isomeric butanediol, pentanediol, neopentanediol, hexanediol, octanediol, diethylene glycol, dipropylene glycol, 2-ethyl-1,3-hexanediol, 2,2,4-dimethylpentanediol, glycerol, and trimethylolpropane.

In some examples, an amount of the cocatalyst is 0-5 wt % (for example, 0.05 wt %, 0.2 wt %, 0.5 wt %, 1 wt %, 2 wt % or 4 wt %) of a weight of the isocyanate monomer, preferably 0.1-5 wt %, and more preferably 0.5-3 wt %.

When the cocatalyst is used, the substance actually exerting the co-catalyst effect is carbamate generated by the reaction of the cocatalyst with the initial isocyanate. Therefore, it is also suitable not to use the preceding alcohol but to prepare carbamate separately by reacting the preceding alcohol with isocyanate and then to add it to the reaction in the form of a cocatalyst.

In some examples, when a ratio of the consumed mass of isocyanate monomers in the system to the total mass of isocyanate monomers in the system reaches 10-80%, preferably 30-70%, the reaction may be terminated by adding the terminating agent II. In some examples, the terminating agent II is selected from one or more of acyl chloride (for example, formyl chlorine, acetyl chlorine, benzoyl chloride, benzenedicarbonyl dichloride, and the like), sulfonate (for example, methyl toluenesulfonate, ethyl toluenesulfonate, and the like), alkyl phosphate (for example, monobutyl phosphate, dibutyl phosphate, monoethyl phosphate, diethyl phosphate, dioctyl phosphate, bis(2-ethylhexyl)phosphate, and the like), and sulphate (for example, dimethyl sulfate, diethyl sulfate, and the like).

In some examples, an amount of the terminating agent II in step (31) is 80-120% (for example, 90%, 100% or 110%) of a molar amount of the catalyst II.

The reaction system herein may be carried out without solvent or in the presence of a solvent inert to isocyanates. The suitable solvent may be, but is not limited to, one or more of butyl acetate, ethyl acetate, tetrahydrofuran, propylene glycol methyl ether acetate, xylene, propyleneglycol diacetate, butanone, methyl isoamyl ketone, cyclohexanone, hexane, toluene, xylene, benzene, chlorobenzene, orthodichlorobenzene, hydrocarbon mixtures, dichloromethane, and the like. However, the reaction system herein is preferably carried out without solvent.

In the reaction system herein, the alcohol cocatalyst may be added to the reaction system at any reaction stage. For example, the cocatalyst may be added to the initial isocyanate monomers before the reaction, or may be added to the system after the addition of the catalyst II, or may be added to the system after the reaction reaches a certain conversion rate.

The catalyst II in the reaction system herein may be used directly without dilution or may be used in the form of a solution in a solvent. The suitable solvent may be any compound that does not react with phosphine, such as aliphatic or aromatic hydrocarbon, alcohol, ketone, ester, and ether. Preferably, the catalyst is diluted with alcohol or the catalyst is not diluted.

In some examples, a reaction temperature of step (31) is 40-70° C. (for example, 50° C. or 60° C.).

In some examples, before the polyisocyanate reaction solution obtained after the reaction is terminated enters the separation device, the polyisocyanate reaction solution is subjected to heat treatment in step (32) by being heated to 10-30° C. higher than the heat-sensitive temperature of the product with a retention time of 5-30 min. The heat-sensitive temperature of the uretdione polyisocyanate is 130-135° C., which means that the temperature of the heat treatment is 140-165° C. (for example, 145° C., 150° C., 155° C. or 160° C.).

It is found that when the reaction of the uretdione polyisocyanate system is completed, the tertiary phosphine catalyst and the terminating agent can generate a salt compound, and such a salt compound still has a weak catalytic activity so that the storage stability of the product is poor. It is speculated that when heat treatment is carried out on the reaction solution, the salt generated by the catalyst and the terminating agent can react with isocyanate groups in the reaction solution at a high temperature to generate more stable substances and thus loses catalytic activity, thereby significantly improving the storage stability of the product.

Since uretdione polyisocyanate can be easily decomposed at a high temperature, in order to reduce the decomposition of the obtained polyisocyanate product, the process conditions of the separation treatment need to be controlled. In some examples, the separation device for the separation treatment in step (33) may be a two-stage short-path evaporator. In some examples, the separation treatment has the process conditions that a separation temperature is 100-160° C. (for example, 105° C., 120° C., 130° C. or 140° C.), preferably 110-150° C., and a separation absolute pressure is 5-200 Pa (for example, 5 Pa, 10 Pa, 50 Pa, 100 Pa or 150 Pa).

In some specific embodiments, the method for preparing uretdione polyisocyanate includes the following steps;

(31) hexamethylene diisocyanate (HDI) is added to a reaction vessel and heated to 40-70° C., then a catalyst II and a cocatalyst are added sequentially with stirring, a polymerization reaction is carried out, and NCO % of the reaction solution is monitored; and when the NCO % drops to an appropriate value, a terminating agent II is added to terminate the reaction to obtain a uretdione polyisocyanate reaction solution;

(32) heat treatment is carried out on the obtained uretdione polyisocyanate reaction solution to obtain a heat-treated uretdione polyisocyanate mixture, where a temperature of the heat treatment is 10-30° C. higher than a heat-sensitive temperature of the obtained polyisocyanate product, and a time of the heat treatment is 5-30 min; and

(33) then separation treatment is carried out on the uretdione polyisocyanate mixture through a separation device (for example, a two-stage short-path evaporator) to remove unreacted HDI monomers in the reaction system to prepare uretdione polyisocyanate;

where the heat-sensitive temperature of the uretdione polyisocyanate is 130-135° C.

Furthermore, in the preparation method of the present disclosure, a stabilizer and an additive which are the conventional additives in the polyisocyanate field may be added at any desired timing. The stabilizer and the additive include, but are not limited to, an anti-oxidant, a sterically-hindered phenolic substance (for example, 2,6-di-tert-butyl-4-methylphenol, 3,5-di-tert-butyl-4-hydroxyphenyl octadecyl propionate, and the like), phosphite (for example, tris(nonylphenyl)phosphite, tris(2,4-di-tert-butylphenyl)phosphite, and the like), an ultraviolet absorbent (for example, benzotriazole, salicylate, benzophenone, and the like), and a hindered amine light stabilizer (for example, 2,2,6,6-tetramethylpiperidine), and the like.

The present disclosure also relates to related products such as polyurethane coatings and polyurethane adhesives that are prepared using the preceding polyisocyanate composition or using polyisocyanate prepared using the preceding preparation method.

Additionally, the polyisocyanate composition of the present disclosure or a polyisocyanate composition prepared using the preparation method of the present disclosure may be blocked with a blocking agent before being used to prepare other related products such as polyurethane coatings and polyurethane adhesives.

Compared with the related art, the technical solutions of the present disclosure have the beneficial effects below.

In the present disclosure, during the process of preparing the polyisocyanate composition, the system after the polymerization reaction and before the separation treatment is subjected to heat treatment so that changes in the molecular mass distribution of the final product are small; moreover, the heat treatment is carried out at a temperature 10-30° C. higher than the heat-sensitive temperature of the obtained polyisocyanate product so that the substances affecting the stability in the system loses the catalytic activity, thereby greatly improving the storage stability of the final product (especially the viscosity stability and the stability of the content of unreacted monomers).

The stability of the polyisocyanate composition prepared in the present disclosure is greatly improved, the increase of the viscosity of the polyisocyanate composition stored at 50° C. for 30 days is less than or equal to 15% of the initial viscosity of the polyisocyanate composition, and the change in the content of unreacted monomers and the change in the color are also small.

DETAILED DESCRIPTION

For a detailed understanding of technical features and contents of the present disclosure, preferred embodiments of the present disclosure are described in more detail below. Although the preferred embodiments of the present disclosure are described through examples, it is to be understood that the present disclosure may be implemented in various manners and should not be limited to the embodiments set forth herein.

Test Method (1) Measurement of the content of free isocyanate monomers:

The quantitation of isocyanate raw materials was carried out by gel chromatography (LC-20AD/RID-10A, where the chromatographic columns were MZ-Gel SD plus of 10E3A and 5 μm (8.0*300 mm), MZ-Gel SDplus of 500 A and 5 μm (8.0*300 mm) and MZ-Gel SDplus of 100 A and 5 μm (8.0*300 mm) in series, produced by Shimadzu; the mobile phase was tetrahydrofuran; the flow rate was 1.0 mL/min; the analysis time was 40 min; and the column temperature was 35° C.); the areas of polymers and monomers in the system were measured using an area normalization method; and the content of isocyanate monomers (%)=S (isocyanate monomer peak area)/S (sum of peak areas of components) *100%.

(2) The NCO % content was tested with the standard GB/T 12009.4.

(3) Measurement method of the viscosity of the product: the dynamic mechanical viscosity was measured using BrookField DV-I Prime viscosity meter with an S21 rotor at 25° C.

(4) Measurement method of the color of the product: the color was measured in a 50 mm disposable rectangular cuvette using LICO 400 produced by HACH Lange with reference to GB/T 3143-1982 method.

<Chemical Raw Material Source>

1,6-hexamethylene diisocyanate, Wannate® HDI, from WANHUA CHEMICAL;

2-ethyl-1,3-hexanediol, with the purity of ≥99%, from SIGMA-ALDRICH;

tetraethylammonium hydroxide solution, with the concentration of 25 wt %, methanol solution, from SIGMA-ALDRICH;

hydroxyethyltrimethylammonium hydroxide solution, with the concentration of 25 wt %, methanol solution, from SIGMA-ALDRICH;

benzyltrimethylammonium hydroxide solution, with the concentration of 25 wt %, methanol solution, from SIGMA-ALDRICH;

tri-n-octylphosphine, with the purity of >98.5%, from ALADDIN;

tri-tert-butylphosphine, with the purity of >96%, from ALADDIN;

bis(2-ethylhexyl)phosphate (diisooctyl phosphate), with the purity of >98.5%, from ALADDIN;

dibutyl phosphate, with the purity of >98.5%, from ALADDIN.

In the following Examples and Comparative Examples, unless otherwise stated, the reaction solution was kept under the protection of dry nitrogen before the reaction, during the addition of the catalyst and throughout the reaction. Unless otherwise stated, all percentages in the disclosure are mass percentages.

Example 1

(1) 1000 g of hexamethylene diisocyanate (HDI) was added to a reaction device and heated to 70° C., 2 g of 2-ethyl-1,3-hexanediol solution (with the concentration of 20 wt %) of a tetraethylammonium hydroxide solution (with the concentration of 25 wt %, methanol solution) was added, a polymerization reaction was carried out, and NCO % of the reaction solution was monitored; and when the NCO content of the reaction solution reached 39.2 wt %, 0.22 g of bis(2-ethylhexyl)phosphate was added to terminate the reaction to obtain an HDI trimer polyisocyanate reaction solution.

(2) Heat treatment was carried out on the reaction solution at 185-190° C. for 20 min to obtain a heat-treated HDI trimer polyisocyanate mixture.

(3) The heat-treated mixture was introduced to a two-stage series film evaporator for separation treatment, where a separation temperature and a separation absolute pressure of the first-stage film evaporator were 155±2.5° C. and 50-100 Pa, respectively, and a separation temperature and a separation absolute pressure of the second-stage film evaporator were 156±2.5° C. and 10-50 Pa, respectively, and unreacted isocyanate monomers were removed to obtain an HDI trimer polyisocyanate composition.

The prepared polyisocyanate composition was tested, where a chromaticity was 15 Hazen, a viscosity was 2830 mPa·s (25° C.), and a content of residual HDI monomers was 0.07 wt %.

After the prepared polyisocyanate composition was stored at 50° C. for 30 days, the polyisocyanate composition was tested, where a chromaticity was 19 Hazen, a viscosity was 2985 mPa·s (25° C.), and a content of residual HDI monomers was 0.09 wt %.

After comparison, the absolute value of the viscosity difference of the product before and after storage was 155 mPa·s, and the change in the viscosity of the product was 5.48% of the initial viscosity of the product. The absolute value of the color difference of the product before and after storage was 4 Hazen. The absolute value of the residual HDI monomer content difference of the product before and after storage was 0.02 wt %. Therefore, the stability of products before and after storage had been greatly improved.

Example 2

(1) 1000 g of hexamethylene diisocyanate (HDI) was added to a reaction device and heated to 65° C., 1.6 g of 2-ethyl-1,3-hexanediol solution (with the concentration of 20 wt %) of a hydroxyethyltrimethylammonium hydroxide solution (with the concentration of 25 wt %, methanol solution) was added, a polymerization reaction was carried out, and NCO % of the reaction solution was monitored; and when the NCO content of the reaction solution reached 40.5 wt %, 0.15 g of dibutyl phosphate was added to terminate the reaction to obtain an HDI trimer polyisocyanate reaction solution.

(2) Heat treatment was carried out on the reaction solution at 170-175° C. for 30 min to obtain a heat-treated HDI trimer polyisocyanate mixture.

(3) The heat-treated mixture was introduced to a two-stage series film evaporator for separation treatment, where a separation temperature and a separation absolute pressure of the first-stage film evaporator were 155±2.5° C. and 50-100 Pa, respectively, and a separation temperature and a separation absolute pressure of the second-stage film evaporator were 156±2.5° C. and 10-50 Pa, respectively, and unreacted isocyanate monomers were removed to obtain an HDI trimer polyisocyanate composition.

The prepared polyisocyanate composition was tested, where a chromaticity was 12 Hazen, a viscosity was 2790 mPa·s (25° C.), and a content of residual HDI monomers was 0.06 wt %.

After the prepared polyisocyanate composition was stored at 50° C. for 30 days, the polyisocyanate composition was tested, where a chromaticity was 14 Hazen, a viscosity was 3015 mPa·s (25° C.), and a content of residual HDI monomers was 0.09 wt %.

After comparison, the absolute value of the viscosity difference of the product before and after storage was 225 mPa·s, and the change in the viscosity of the product was 8.06% of the initial viscosity of the product. The absolute value of the color difference of the product before and after storage was 2 Hazen. The absolute value of the residual HDI monomer content difference of the product before and after storage was 0.03 wt %. Therefore, the stability of products before and after storage had been greatly improved.

Example 3

(1) 1000 g of hexamethylene diisocyanate (HDI) was added to a reaction device and heated to 65° C., 2.4 g of 2-ethyl-1,3-hexanediol solution (with the concentration of 20 wt %) of a benzyltrimethylammonium hydroxide solution (with the concentration of 25 wt %, methanol solution) was added, a polymerization reaction was carried out, and NCO % of the reaction solution was monitored; and when the NCO content of the reaction solution reached 40.3 wt %, 0.25 g of bis(2-ethylhexyl)phosphate was added to terminate the reaction to obtain an HDI trimer polyisocyanate reaction solution.

(2) Heat treatment was carried out on the reaction solution at 190-195° C. for 5 min to obtain a heat-treated HDI trimer polyisocyanate mixture.

(3) The heat-treated mixture was introduced to a two-stage series film evaporator for separation treatment, where a separation temperature and a separation absolute pressure of the first-stage film evaporator were 155±2.5° C. and 50-100 Pa, respectively, and a separation temperature and a separation absolute pressure of the second-stage film evaporator were 156±2.5° C. and 10-50 Pa, respectively, and unreacted isocyanate monomers were removed to obtain an HDI trimer polyisocyanate composition.

The prepared polyisocyanate composition was tested, where a chromaticity was 15 Hazen, a viscosity was 2850 mPa·s (25° C.), and a content of residual HDI monomers was 0.12 wt %.

After the prepared polyisocyanate composition was stored at 50° C. for 30 days, the polyisocyanate composition was tested, where a chromaticity was 18 Hazen, a viscosity was 3045 mPa·s (25° C.), and a content of residual HDI monomers was 0.14 wt %.

After comparison, the absolute value of the viscosity difference of the product before and after storage was 195 mPa·s, and the change in the viscosity of the product was 6.84% of the initial viscosity of the product. The absolute value of the color difference of the product before and after storage was 3 Hazen. The absolute value of the residual HDI monomer content difference of the product before and after storage was 0.02 wt %. Therefore, the stability of products before and after storage had been greatly improved.

Comparative Example 1

(1) 1000 g of hexamethylene diisocyanate (HDI) was added to a reaction device and heated to 70° C., 2 g of 2-ethyl-1,3-hexanediol solution (with the concentration of 20 wt %) of a tetraethylammonium hydroxide solution (with the concentration of 25 wt %, methanol solution) was added, a polymerization reaction was carried out, and NCO % of the reaction solution was monitored; and when the NCO content of the reaction solution reached 39.2 wt %, 0.22 g of bis(2-ethylhexyl)phosphate was added to terminate the reaction to obtain an HDI trimer polyisocyanate reaction solution.

(2) The reaction solution was introduced to a two-stage series film evaporator for separation treatment, where a separation temperature and a separation absolute pressure of the first-stage film evaporator were 155±2.5° C. and 50-100 Pa, respectively, and a separation temperature and a separation absolute pressure of the second-stage film evaporator were 156±2.5° C. and 10-50 Pa, respectively, and unreacted isocyanate monomers were removed to obtain an HDI trimer polyisocyanate composition.

The prepared polyisocyanate composition was tested, where a chromaticity was 14 Hazen, a viscosity was 2790 mPa·s (25° C.), and a content of residual HDI monomers was 0.07 wt %.

After the prepared polyisocyanate composition was stored at 50° C. for 30 days, the polyisocyanate composition was tested, where a chromaticity was 27 Hazen, a viscosity was 3292 mPa·s (25° C.), and a content of residual HDI monomers was 0.21 wt %.

After comparison, the absolute value of the viscosity difference of the product before and after storage was 502 mPa·s, and the change in the viscosity of the product was 18% of the initial viscosity of the product. The absolute value of the color difference of the product before and after storage was 13 Hazen. The absolute value of the residual HDI monomer content difference of the product before and after storage was 0.14 wt %. Therefore, the improvement of the stability of the product before and after storage was not as good as that of the corresponding example.

Comparative Example 2

(1) 1000 g of hexamethylene diisocyanate (HDI) was added to a reaction device and heated to 70° C., 2 g of 2-ethyl-1,3-hexanediol solution (with the concentration of 20 wt %) of a tetraethylammonium hydroxide solution (with the concentration of 25 wt %, methanol solution) was added, a polymerization reaction was carried out, and NCO % of the reaction solution was monitored; and when the NCO content of the reaction solution reached 39.2 wt %, 0.22 g of bis(2-ethylhexyl)phosphate was added to terminate the reaction to obtain an HDI trimer polyisocyanate reaction solution.

(2) The reaction solution was introduced to a two-stage series film evaporator for separation treatment, where a separation temperature and a separation absolute pressure of the first-stage film evaporator were 155±2.5° C. and 50-100 Pa, respectively, and a separation temperature and a separation absolute pressure of the second-stage film evaporator were 156±2.5° C. and 10-50 Pa, respectively, and unreacted isocyanate monomers were removed to obtain an impurity-removed HDI trimer polyisocyanate reaction solution.

(3) Heat treatment was carried out on the impurity-removed polyisocyanate reaction solution at 160-165° C. for 30 min to obtain an HDI trimer polyisocyanate composition.

The prepared polyisocyanate composition was tested, where a chromaticity was 14 Hazen, a viscosity was 2820 mPa·s (25° C.), and a content of residual HDI monomers was 0.11 wt %.

After the prepared polyisocyanate composition was stored at 50° C. for 30 days, the polyisocyanate composition was tested, where a chromaticity was 22 Hazen, a viscosity was 3273 mPa·s (25° C.), and a content of residual HDI monomers was 0.23 wt %.

After comparison, the absolute value of the viscosity difference of the product before and after storage was 453 mPa·s, and the change in the viscosity of the product was 16% of the initial viscosity of the product. The absolute value of the color difference of the product before and after storage was 8 Hazen. The absolute value of the residual HDI monomer content difference of the product before and after storage was 0.12 wt %. Therefore, the improvement of the stability of the product before and after storage was not as good as that of the corresponding example.

Example 4

(1) 2000 g of hexamethylene diisocyanate (HDI) and 6 g of bis(2-ethylhexyl)phosphate were added to a reaction vessel, 45 g of water vapor was slowly introduced to the reaction vessel for a reaction after the system was heated to 150° C., and NCO % of the reaction solution was monitored, where an introduction time of the water vapor was controlled to be 150 min, to obtain a biuret polyisocyanate reaction solution.

(2) Heat treatment was carried out on the reaction solution at 170-175° C. for 5 min to obtain a heat-treated biuret polyisocyanate mixture.

(3) The heat-treated polyisocyanate mixture was introduced into a two-stage series film evaporator for separation treatment, where a separation temperature and a separation absolute pressure of the first-stage film evaporator were 147±2.5° C. and 50-100 Pa, respectively, and a separation temperature and a separation absolute pressure of the second-stage film evaporator were 147±2.5° C. and 10-50 Pa, respectively, and unreacted HDI monomers were removed to obtain a biuret polyisocyanate composition.

The prepared polyisocyanate composition was tested, where a chromaticity was 12 Hazen, a viscosity was 8100 mPa·s (25° C.), and a content of residual HDI monomers was 0.21 wt %.

After the prepared polyisocyanate composition was stored at 50° C. for 30 days, the polyisocyanate composition was tested, where a chromaticity was 17 Hazen, a viscosity was 8535 mPa·s (25° C.), and a content of residual HDI monomers was 0.25 wt %.

After comparison, the absolute value of the viscosity difference of the product before and after storage was 435 mPa·s, and the change in the viscosity of the product was 5.37% of the initial viscosity of the product. The absolute value of the color difference of the product before and after storage was 5 Hazen. The absolute value of the residual HDI monomer content difference of the product before and after storage was 0.04 wt %. Therefore, the stability of products before and after storage had been greatly improved.

Example 5

(1) 2000 g of hexamethylene diisocyanate (HDI) and 5.5 g of dibutyl phosphate were added to a reaction vessel, 45 g of water vapor was slowly introduced to the reaction vessel for a reaction after the system was heated to 150° C., and NCO % of the reaction solution was monitored, where an introduction time of the water vapor was controlled to be 150 min, to obtain a biuret polyisocyanate reaction solution.

(2) Heat treatment was carried out on the reaction solution at 160-165° C. for 20 min to obtain a heat-treated biuret polyisocyanate mixture.

(3) The heat-treated polyisocyanate mixture was introduced into a two-stage series film evaporator for separation treatment, where a separation temperature and a separation absolute pressure of the first-stage film evaporator were 147±2.5° C. and 50-100 Pa, respectively, and a separation temperature and a separation absolute pressure of the second-stage film evaporator were 147±2.5° C. and 10-50 Pa, respectively, and unreacted HDI monomers were removed to obtain a biuret polyisocyanate composition.

The prepared polyisocyanate composition was tested, where a chromaticity was 16 Hazen, a viscosity was 8155 mPa·s (25° C.), and a content of residual HDI monomers was 0.17 wt %.

After the prepared polyisocyanate composition was stored at 50° C. for 30 days, the polyisocyanate composition was tested, where a chromaticity was 19 Hazen, a viscosity was 8911 mPa·s (25° C.), and a content of residual HDI monomers was 0.25 wt %.

After comparison, the absolute value of the viscosity difference of the product before and after storage was 756 mPa·s, and the change in the viscosity of the product was 9.23% of the initial viscosity of the product. The absolute value of the color difference of the product before and after storage was 3 Hazen. The absolute value of the residual HDI monomer content difference of the product before and after storage was 0.08 wt %. Therefore, the stability of products before and after storage had been greatly improved.

Example 6

(1) 2000 g of hexamethylene diisocyanate (HDI) and 6 g of bis(2-ethylhexyl)phosphate were added to a reaction vessel, 45 g of water vapor was slowly introduced to the reaction vessel for a reaction after the system was heated to 150° C., and NCO % of the reaction solution was monitored, where an introduction time of the water vapor was controlled to be 150 min, to obtain a biuret polyisocyanate reaction solution.

(2) Heat treatment was carried out on the reaction solution at 150-155° C. for 30 min to obtain a heat-treated biuret polyisocyanate mixture.

(3) The heat-treated polyisocyanate mixture was introduced into a two-stage series film evaporator for separation treatment, where a separation temperature and a separation absolute pressure of the first-stage film evaporator were 147±2.5° C. and 50-100 Pa, respectively, and a separation temperature and a separation absolute pressure of the second-stage film evaporator were 147±2.5° C. and 10-50 Pa, respectively, and unreacted HDI monomers were removed to obtain a biuret polyisocyanate composition.

The prepared polyisocyanate composition was tested, where a chromaticity was 14 Hazen, a viscosity was 8165 mPa·s (25° C.), and a content of residual HDI monomers was 0.17 wt %.

After the prepared polyisocyanate composition was stored at 50° C. for 30 days, the polyisocyanate composition was tested, where a chromaticity was 18 Hazen, a viscosity was 9317 mPa·s (25° C.), and a content of residual HDI monomers was 0.26 wt %.

After comparison, the absolute value of the viscosity difference of the product before and after storage was 1152 mPa·s, and the change in the viscosity of the product was 14.12% of the initial viscosity of the product. The absolute value of the color difference of the product before and after storage was 4 Hazen. The absolute value of the residual HDI monomer content difference of the product before and after storage was 0.09 wt %. Therefore, the stability of products before and after storage had been greatly improved.

Comparative Example 3

(1) 2000 g of hexamethylene diisocyanate (HDI) and 6 g of bis(2-ethylhexyl)phosphate were added to a reaction vessel, 45 g of water vapor was slowly introduced to the reaction vessel for a reaction after the system was heated to 150° C., and NCO % of the reaction solution was monitored, where an introduction time of water vapor was controlled to be 150 min, to obtain a biuret polyisocyanate reaction solution.

(2) The reaction solution was introduced into a two-stage series film evaporator for separation treatment, where a separation temperature and a separation absolute pressure of the first-stage film evaporator were 147±2.5° C. and 50-100 Pa, respectively, and a separation temperature and a separation absolute pressure of the second-stage film evaporator were 147±2.5° C. and 10-50 Pa, respectively, and unreacted HDI monomers were removed to obtain biuret polyisocyanate.

The prepared polyisocyanate composition was tested, where a chromaticity was 11 Hazen, a viscosity was 8020 mPa·s (25° C.), and a content of residual HDI monomers was 0.23 wt %.

After the prepared polyisocyanate composition was stored at 50° C. for 30 days, the polyisocyanate composition was tested, where a chromaticity was 23 Hazen, a viscosity was 9612 mPa·s (25° C.), and a content of residual HDI monomers was 0.45 wt %.

After comparison, the absolute value of the viscosity difference of the product before and after storage was 1592 mPa·s, and the change in the viscosity of the product was 19.85% of the initial viscosity of the product. The absolute value of the color difference of the product before and after storage was 12 Hazen. The absolute value of the residual HDI monomer content difference of the product before and after storage was 0.22 wt %. Therefore, the improvement of the stability of the product before and after storage was not as good as that of the corresponding example.

Comparative Example 4

(1) 2000 g of hexamethylene diisocyanate (HDI) and 5.5 g of dibutyl phosphate were added to a reaction vessel, 45 g of water vapor was slowly introduced to the reaction vessel for a reaction after the system was heated to 150° C., and NCO % of the reaction solution was monitored, where an introduction time of the water vapor was controlled to be 150 min, to obtain a biuret polyisocyanate reaction solution.

(2) The polyisocyanate reaction solution was introduced into a two-stage series film evaporator for separation treatment, where a separation temperature and a separation absolute pressure of the first-stage film evaporator were 147±2.5° C. and 50-100 Pa, respectively, and a separation temperature and a separation absolute pressure of the second-stage film evaporator were 147±2.5° C. and 10-50 Pa, respectively, and unreacted HDI monomers were removed to obtain an impurity-removed polyisocyanate reaction solution.

(3) Heat treatment was carried out on the reaction solution at 140-145° C. for 30 min to obtain a biuret polyisocyanate composition.

The prepared polyisocyanate composition was tested, where a chromaticity was 14 Hazen, a viscosity was 8078 mPa·s (25° C.), and a content of residual HDI monomers was 0.21 wt %.

After the prepared polyisocyanate composition was stored at 50° C. for 30 days, the polyisocyanate composition was tested, where a chromaticity was 21 Hazen, a viscosity was 9464 mPa·s (25° C.), and a content of residual HDI monomers was 0.38 wt %.

After comparison, the absolute value of the viscosity difference of the product before and after storage was 1386 mPa·s, and the change in the viscosity of the product was 17.16% of the initial viscosity of the product. The absolute value of the color difference of the product before and after storage was 7 Hazen. The absolute value of the residual HDI monomer content difference of the product before and after storage was 0.17 wt %. Therefore, the improvement of the stability of the product before and after storage was not as good as that of the examples.

Example 7

(1) Hexamethylene diisocyanate (HDI) with a total mass M of 1000 g was added to a reaction vessel and heated to 50°

C., 2.5 g of tri-n-octylphosphine and 15 g of 2-ethyl-1,3-hexanediol were sequentially added at such a temperature with stirring, a polymerization reaction was carried out, and NCO % of the reaction solution was monitored, that is, the reaction system was quantitatively monitored by gel chromatography; and when the consumed mass M1 of HDI in the system accounted for 40% of the total mass M of the added HDI, 2.2 g of bis(2-ethylhexyl)phosphate was added, the system was heated to 90° C. and held at 90° C. for 2 h, and the reaction was terminated to obtain a uretdione polyisocyanate reaction solution.

(2) Heat treatment was carried out on the polyisocyanate reaction solution at 140-145° C. for 30 min to obtain a heat-treated uretdione polyisocyanate mixture.

(3) The heat-treated polyisocyanate mixture was introduced into a two-stage short-path evaporator for separation treatment, where a separation temperature and a separation absolute pressure of the first-stage short-path evaporator were 135±2.5° C. and 50-100 Pa, respectively, and a separation temperature and a separation absolute pressure of the second-stage short-path evaporator were 135±2.5° C. and 10-50 Pa, respectively, and unreacted HDI monomers in the reaction system were removed to obtain a uretdione polyisocyanate composition.

The prepared polyisocyanate composition was tested, where a chromaticity was 15 Hazen, a viscosity was 145 mPa·s (25° C.), and a content of residual HDI monomers was 0.16 wt %.

After the prepared polyisocyanate composition was stored at 50° C. for 30 days, the polyisocyanate composition was tested, where a chromaticity was 21 Hazen, a viscosity was 158 mPa·s (25° C.), and a content of residual HDI monomers was 0.21 wt %.

After comparison, the absolute value of the viscosity difference of the product before and after storage was 13 mPa·s, and the change in the viscosity of the product was 8.97% of the initial viscosity of the product. The absolute value of the color difference of the product before and after storage was 6 Hazen. The absolute value of the residual HDI monomer content difference of the product before and after storage was 0.05 wt %. Therefore, the stability of products before and after storage had been greatly improved.

Example 8

(1) Hexamethylene diisocyanate (HDI) with a total mass M of 1000 g was added to a reaction vessel and heated to 50° C., 2.5 g of tri-n-octylphosphine and 15 g of 2-ethyl-1,3-hexanediol were sequentially added at such a temperature with stirring, a polymerization reaction was carried out, and NCO % of the reaction solution was monitored, that is, the reaction system was quantitatively monitored by gel chromatography; and when the consumed mass M1 of HDI in the system accounted for 40% of the total mass M of the added HDI, 2.2 g of bis(2-ethylhexyl)phosphate was added, the system was heated to 90° C. and held at 90° C. for 2 h, and the reaction was terminated to obtain a uretdione polyisocyanate reaction solution.

(2) Heat treatment was carried out on the polyisocyanate reaction solution at 160-165° C. for 5 min to obtain a heat-treated uretdione polyisocyanate mixture.

(3) The heat-treated polyisocyanate mixture was introduced into a two-stage short-path evaporator for separation treatment, where a separation temperature and a separation absolute pressure of the first-stage short-path evaporator were 135±2.5° C. and 50-100 Pa, respectively, and a separation temperature and a separation absolute pressure of the second-stage short-path evaporator were 135±2.5° C. and 10-50 Pa, respectively, and unreacted HDI monomers in the reaction system were removed to obtain a uretdione polyisocyanate composition.

The prepared polyisocyanate composition was tested, where a chromaticity was 17 Hazen, a viscosity was 149 mPa·s (25° C.), and a content of residual HDI monomers was 0.17 wt %.

After the prepared polyisocyanate composition was stored at 50° C. for 30 days, the polyisocyanate composition was tested, where a chromaticity was 22 Hazen, a viscosity was 166 mPa·s (25° C.), and a content of residual HDI monomers was 0.23 wt %.

After comparison, the absolute value of the viscosity difference of the product before and after storage was 17 mPa·s, and the change in the viscosity of the product was 11.41% of the initial viscosity of the product. The absolute value of the color difference of the product before and after storage was 5 Hazen. The absolute value of the residual HDI monomer content difference of the product before and after storage was 0.06 wt %. Therefore, the stability of products before and after storage had been greatly improved.

Example 9

(1) Hexamethylene diisocyanate (HDI) with a total mass M of 1000 g was added to a reaction vessel and heated to 50° C., 2.2 g of tri-tert-butylphosphine and 15 g of 2-ethyl-1,3-hexanediol were sequentially added at such a temperature with stirring, a polymerization reaction was carried out, and NCO % of the reaction solution was monitored, that is, the reaction system was quantitatively monitored by gel chromatography; and when the consumed mass M1 of HDI in the system accounted for 41% of the total mass M of the added HDI, 2.3 g of dibutyl phosphate was added, heated to 90° C. and held at 90° C. for 2 h, and the reaction was terminated to obtain a uretdione polyisocyanate reaction solution.

(2) Heat treatment was carried out on the polyisocyanate reaction solution at 145-150° C. for 15 min to obtain a heat-treated uretdione polyisocyanate mixture.

(3) The heat-treated polyisocyanate mixture was introduced into a two-stage short-path evaporator for separation treatment, where a separation temperature and a separation absolute pressure of the first-stage short-path evaporator were 135±2.5° C. and 50-100 Pa, respectively, and a separation temperature and a separation absolute pressure of the second-stage short-path evaporator were 135±2.5° C. and 10-50 Pa, respectively, and unreacted HDI monomers in the reaction system were removed to obtain a uretdione polyisocyanate composition.

The prepared polyisocyanate composition was tested, where a chromaticity was 16 Hazen, a viscosity was 156 mPa·s (25° C.), and a content of residual HDI monomers was 0.20 wt %.

After the prepared polyisocyanate composition was stored at 50° C. for 30 days, the polyisocyanate composition was tested, where a chromaticity was 23 Hazen, a viscosity was 177 mPa·s (25° C.), and a content of residual HDI monomers was 0.28 wt %.

After comparison, the absolute value of the viscosity difference of the product before and after storage was 21 mPa·s, and the change in the viscosity of the product was 13.46% of the initial viscosity of the product. The absolute value of the color difference of the product before and after storage was 7 Hazen. The absolute value of the residual HDI monomer content difference of the product before and after storage was 0.08 wt %. Therefore, the stability of products before and after storage had been greatly improved.

Comparative Example 5

(1) Hexamethylene diisocyanate (HDI) with a total mass M of 1000 g was added to a reaction vessel and heated to 50° C., 2.5 g of tri-n-octylphosphine and 15 g of 2-ethyl-1,3-hexanediol were sequentially added at such a temperature with stirring, a polymerization reaction was carried out, and NCO % of the reaction solution was monitored, that is, the reaction system was quantitatively monitored by gel chromatography; and when the consumed mass M1 of HDI in the system accounted for 40% of the total mass M of the added HDI, 2.2 g of bis(2-ethylhexyl)phosphate was added, the system was heated to 90° C. and held at 90° C. for 2 h, and the reaction was terminated to obtain a uretdione polyisocyanate reaction solution.

(2) The polyisocyanate reaction solution was introduced into a two-stage short-path evaporator for separation treatment, where a separation temperature and a separation absolute pressure of the first-stage short-path evaporator were 135±2.5° C. and 50-100 Pa, respectively, and a separation temperature and a separation absolute pressure of the second-stage short-path evaporator were 135±2.5° C. and 10-50 Pa, respectively, and unreacted HDI monomers in the reaction system were removed to obtain a uretdione polyisocyanate composition.

The prepared polyisocyanate composition was tested, where a chromaticity was 14 Hazen, a viscosity was 147 mPa·s (25° C.), and a content of residual HDI monomers was 0.15 wt %.

After the prepared polyisocyanate composition was stored at 50° C. for 30 days, the polyisocyanate composition was tested, where a chromaticity was 26 Hazen, a viscosity was 184 mPa·s (25° C.), and a content of residual HDI monomers was 0.33 wt %.

After comparison, the absolute value of the viscosity difference of the product before and after storage was 37 mPa·s, and the change in the viscosity of the product was 25.17% of the initial viscosity of the product. The absolute value of the color difference of the product before and after storage was 12 Hazen. The absolute value of the residual HDI monomer content difference of the product before and after storage was 0.18 wt %. Therefore, the improvement of the stability of the product before and after storage was not as good as that of the corresponding example.

Comparative Example 6

(1) Hexamethylene diisocyanate (HDI) with a total mass M of 1000 g was added to a reaction vessel and heated to 50° C., 2.5 g of tri-n-octylphosphine and 15 g of 2-ethyl-1,3-hexanediol were sequentially added at such a temperature with stirring, a polymerization reaction was carried out, and NCO % of the reaction solution was monitored, that is, the reaction system was quantitatively monitored by gel chromatography; and when the consumed mass M1 of HDI in the system accounted for 40% of the total mass M of the added HDI, 2.2 g of bis(2-ethylhexyl)phosphate was added, heated to 90° C. and held at 90° C. for 2 h, and the reaction was terminated to obtain a uretdione polyisocyanate reaction solution.

(2) The polyisocyanate reaction solution was introduced into a two-stage short-path evaporator for separation treatment, where a separation temperature and a separation absolute pressure of the first-stage short-path evaporator were 135±2.5° C. and 50-100 Pa, respectively, and a separation temperature and a separation absolute pressure of the second-stage short-path evaporator were 135±2.5° C. and 10-50 Pa, respectively, and unreacted HDI monomers in the reaction system were removed to obtain an impurity-removed polyisocyanate reaction solution.

(3) Heat treatment was carried out on the impurity-removed polyisocyanate reaction solution at 130-135° C. for 30 min to obtain a uretdione polyisocyanate composition.

The prepared polyisocyanate composition was tested, where a chromaticity was 15 Hazen, a viscosity was 152 mPa·s (25° C.), and a content of residual HDI monomers was 0.21 wt %.

After the prepared polyisocyanate composition was stored at 50° C. for 30 days, the polyisocyanate composition was tested, where a chromaticity was 24 Hazen, a viscosity was 185 mPa·s (25° C.), and a content of residual HDI monomers was 0.36 wt %.

After comparison, the absolute value of the viscosity difference of the product before and after storage was 33 mPa·s, and the change in the viscosity of the product was 21.71% of the initial viscosity of the product. The absolute value of the color difference of the product before and after storage was 9 Hazen. The absolute value of the residual HDI monomer content difference of the product before and after storage was 0.15 wt %. Therefore, the improvement of the stability of the product before and after storage was not as good as that of the example.

The storage stability (for example, the change in the viscosity, the change in the content of unreacted monomers, and the change in the color) of the polyisocyanate product prepared by the method of the present disclosure is greatly improved. For example, for the polyisocyanate composition having a trimer structure, in some preferred embodiments, the viscosity of the product changes by less than 10% of the initial viscosity of the product, the color changes by less than 5 Hazen, and the content of the unreacted monomers changes by less than or equal to 0.05 wt % when the product was stored at 50° C. for 30 days. For example, for the biuret polyisocyanate composition, in some preferred embodiments, the viscosity of the product changed by less than 15% of the initial viscosity of the product, the color changed by less than 5 Hazen, and the content of the unreacted monomers changed by less than or equal to 0.09 wt % when the product was stored at 50° C. for 30 days. For example, for the uretdione polyisocyanate composition, in some preferred embodiments, the viscosity of the product changes by less than 15% of the initial viscosity of the product, the color changes by less than 7 Hazen, and the content of the unreacted monomers changes by less than or equal to 0.09 wt % when the product was stored at 50° C. for 30 days.

However, for polyisocyanate products that are not subjected to heat treatment in Comparative Examples, the viscosity and color greatly change, and the change in the content of unreacted monomers is also larger than that in Examples. The storage stability of the obtained polyisocyanate products cannot be significantly improved when the conditions of the heat treatment are not appropriate.

Various embodiments of the present disclosure have been described above. The preceding description is not exhaustive but illustrative, and is not limited to the disclosed various embodiments. Without departing from the scope and spirit of the various embodiments described, various modifications and changes are apparent to those skilled in the art.

The invention claimed is:

1. A method for preparing a storage-stable polyisocyanate composition, comprising: carrying out a polymerization reaction on an isocyanate monomer in the presence of a catalyst system; after an appropriate conversion rate is reached, terminating the reaction to obtain a polyisocyanate reaction solution; carrying out heat treatment on the obtained polyisocyanate reaction solution to obtain a heat-treated polyisocyanate mixture, and a time of the heat treatment is 5-30 min; and then carrying out separation treatment on the heat-treated polyisocyanate mixture to remove unreacted isocyanate monomers in the system to prepare the polyisocyanate composition;

wherein a temperature of the heat treatment is 10-30° C. higher than a heat-sensitive temperature of the obtained polyisocyanate composition;

wherein the appropriate conversion rate is defined as: a preset conversion rate for the polyisocyanate composition to be prepared, which is calculated and reflected by controlling NCO % value of the system;

wherein the heat-sensitive temperature is defined as: the polyisocyanate composition is heated within a temperature range of 100-200° C., the temperature range of 100-200° C. is evenly divided into multiple temperature intervals, a viscosity of the heated polyisocyanate composition is measured within these temperature intervals, the measured viscosities and their corresponding temperatures are drawn as a viscosity-temperature curve, and in the drawn curve, a temperature at which a viscosity of the polyisocyanate composition doubles is defined as the heat-sensitive temperature;

wherein the obtained polyisocyanate composition satisfies the following conditions (1) and (2) after being stored at 50° C. for 30 days:

(1) in the stored polyisocyanate composition, the increase of a content of an isocyanate monomer is less than or equal to 0.1 wt %; and (2) in the stored polyisocyanate composition, the increase of a viscosity of the polyisocyanate composition is less than or equal to 15% of an initial viscosity of the polyisocyanate composition.

2. The preparation method according to claim 1, wherein the polyisocyanate composition comprises one or more of trimer polyisocyanate, biuret polyisocyanate, and uretdione polyisocyanate;

a heat-sensitive temperature of the trimer polyisocyanate is 160-165° C.;

a heat-sensitive temperature of the biuret polyisocyanate is 140-145° C.;

a heat-sensitive temperature of the uretdione polyisocyanate is 130-135° C.

3. The preparation method according to claim 1, wherein the preparation method comprises:

(11) under an inert atmosphere, adding the isocyanate monomer to a reaction vessel, heating the isocyanate monomer, adding a catalyst I after the system is heated to a reaction temperature, carrying out a polymerization reaction, and monitoring NCO % of the reaction solution; and when the NCO % drops to an appropriate value, adding a terminating agent I to terminate the reaction to obtain a trimer polyisocyanate reaction solution;

(12) carrying out heat treatment on the obtained trimer polyisocyanate reaction solution to obtain a heat-treated trimer polyisocyanate mixture; and

(13) then carrying out separation treatment on the heat-treated trimer polyisocyanate mixture through a separation device to remove unreacted isocyanate monomers to prepare trimer polyisocyanate;

wherein the heat-sensitive temperature of the trimer polyisocyanate is 160-165° C., and the appropriate value is 35% to 45%;

wherein a temperature of the heat treatment is 10-30° C. higher than a heat-sensitive temperature of the obtained trimer polyisocyanate, and a time of the heat treatment is 5-30 min.

4. The preparation method according to claim 3, wherein the catalyst I in step (11) is a quaternary ammonium base and/or a quaternary ammonium salt catalyst; and/or an addition amount of the catalyst I is 0.001-0.1 wt % of a weight of the isocyanate monomer; and/or the terminating agent I in step (11) is selected from an organic acid and/or an acylating agent; and/or a reaction temperature of step (11) is 30-100° C.; and/or the separation treatment in step (13) has the process conditions that a separation temperature is 90-180° C. and a separation absolute pressure is 5-200 Pa.

5. The preparation method according to claim 1, wherein the preparation method comprises:

(21) adding the isocyanate monomer and an acid catalyst to a reaction vessel, introducing water vapor as a biuret reagent after the system is heated to a reaction temperature, carrying out a polymerization reaction, and monitoring NCO % of the reaction solution; and when the NCO % drops to an appropriate value, stopping introducing the water vapor to terminate the reaction to obtain a biuret polyisocyanate reaction solution;

(22) carrying out heat treatment on the obtained biuret polyisocyanate reaction solution to obtain a heat-treated biuret polyisocyanate mixture; and

(23) then carrying out separation treatment on the biuret polyisocyanate mixture through a separation device to remove unreacted monomers to prepare biuret polyisocyanate;

wherein the heat-sensitive temperature of the biuret polyisocyanate is 140-145° C., and the appropriate value is 33% to 37%;

wherein a temperature of the heat treatment is 10-30° C. higher than a heat-sensitive temperature of the obtained biuret polyisocyanate, and a time of the heat treatment is 5-30 min.

6. The preparation method according to claim 5, wherein a mass ratio of the isocyanate monomer to the water vapor in step (21) is 40-60:1; and/or the acid catalyst in step (21) is selected from one or more of monoalkyl phosphate, dialkyl phosphate, monoaryl phosphate, diaryl phosphate, propionic acid, and pivalic acid, and an amount of the acid catalyst is 0.1-3.0 wt % of a weight of the isocyanate monomer; and/or a reaction temperature of step (21) is 80-280° C., and a reaction time of step (21) is 50-400 min; and/or the separation device in step (23) is a two-stage wiped-film evaporator, and the separation treatment has the process conditions that a separation temperature of the first-stage wiped-film evaporator is 110-180° C., and a separation absolute pressure of the first-stage wiped-film evaporator is 5-500 Pa; and a separation temperature of the second-stage wiped-film evaporator is 120-180° C., and a separation absolute pressure of the second-stage wiped-film evaporator is 5-200 Pa.

7. The preparation method according to claim 1, wherein the preparation method comprises:

(31) adding the isocyanate monomer to a reaction vessel, heating the isocyanate monomer, adding a catalyst II and a cocatalyst sequentially with stirring after the system is heated to a reaction temperature, carrying out a polymerization reaction, and monitoring NCO % of the reaction solution; and when the NCO % drops to an appropriate value, adding a terminating agent II to terminate the reaction to obtain a uretdione polyisocyanate reaction solution;

(32) carrying out heat treatment on the obtained uretdione polyisocyanate reaction solution to obtain a heat-treated uretdione polyisocyanate mixture; and

(33) then carrying out separation treatment on the uretdione polyisocyanate mixture through a separation device to remove unreacted monomers in the reaction system to prepare uretdione polyisocyanate;

wherein the heat-sensitive temperature of the uretdione polyisocyanate is 130-135° C., and the appropriate value is 38% to 42%;

wherein a temperature of the heat treatment is 10-30° C. higher than a heat-sensitive temperature of the obtained uretdione polyisocyanate, and a time of the heat treatment is 5-30 min.

8. The preparation method according to claim 7, wherein the catalyst II in step (31) is a tertiary phosphine catalyst, and an amount of the catalyst II is 0.01-1 wt % of a weight of the isocyanate monomer; and/or the cocatalyst in step (31) is selected from a low molecular mass monovalent fatty alcohol or a low molecular mass polyvalent fatty alcohol, and an amount of the cocatalyst is 0-5 wt % of a weight of the isocyanate monomer; and/or the terminating agent II in step (31) is selected from one or more of acyl chloride, sulfonate, alkyl phosphate, and sulphate, and an amount of the terminating agent II is 80-120% of a molar amount of the catalyst II; and/or a reaction temperature of step (31) is 40-70° C.; and/or the separation treatment in step (33) has the process conditions that a separation temperature is 100-160° C., and a separation absolute pressure is 5-200 Pa.

* * * * *